United States Patent [19]
Jepson

[11] Patent Number: 6,017,383
[45] Date of Patent: Jan. 25, 2000

[54] CONTAMINANT REMOVAL IN A TRANSLATING SLUG FLOW

[75] Inventor: William P. Jepson, Athens, Ohio

[73] Assignee: Ohio University, Athens, Ohio

[21] Appl. No.: 09/139,171

[22] Filed: Aug. 24, 1998

Related U.S. Application Data

[60] Provisional application No. 60/058,945, Aug. 26, 1997.

[51] Int. Cl.[7] .................................................. B01D 47/00
[52] U.S. Cl. ................................. 95/149; 95/187; 95/236
[58] Field of Search .............................. 95/149, 151, 156, 95/187, 235; 96/234, 243, 256, 257, 207, 272, 322, 327, 328

[56] References Cited

U.S. PATENT DOCUMENTS

| | | | |
|---|---|---|---|
| 3,309,845 | 3/1967 | Coulson | 96/327 |
| 3,574,562 | 4/1971 | Kawahata | 96/234 |
| 3,748,827 | 7/1973 | Bulian et al. | 95/235 |
| 3,803,805 | 4/1974 | Low | 95/235 |
| 4,272,499 | 6/1981 | Cason et al. | 96/267 |
| 5,708,211 | 1/1998 | Jepson et al. | 73/861.04 |
| 5,770,068 | 6/1998 | Jepson et al. | 210/741 |

FOREIGN PATENT DOCUMENTS 0 240 340 A2 10/1987 European Pat. Off. .
0 791 391 A1 8/1997 European Pat. Off. .

*Primary Examiner*—Duane S. Smith
*Attorney, Agent, or Firm*—Killworth, Gottman, Hagan & Schaeff, L.L.P.

[57] ABSTRACT

A system and method for removing a contaminant from a carrier gas is provided including the steps of: introducing a liquid into a fluid conduit, wherein the liquid is characterized by a first fluid flow rate and wherein the conduit is arranged to define a conduit periphery that completely encloses fluids within the conduit; introducing a carrier gas and a contaminant into the fluid conduit, wherein the carrier gas is characterized by a second fluid flow rate; arranging the fluid conduit to define an inclined conduit section and establishing the first fluid flow rate and the second fluid flow rate such that a succession of moving slugs are created in the inclined conduit section of the fluid conduit; providing an outlet flow of a third fluid downstream of the succession of moving slugs, wherein the third fluid includes the carrier gas; providing an outlet flow of a fourth fluid downstream of the succession of moving slugs, wherein the fourth fluid includes a combination of the liquid and at least a portion of the contaminant from the carrier gas; regenerating the fourth fluid by removing a least a portion of the contaminant therefrom; and introducing the fourth fluid with the liquid.

22 Claims, 8 Drawing Sheets

CONTAMINANT REMOVAL IN A TRANSLATING SLUG FLOW

CROSS REFERENCE TO RELATED APPLICATIONS

This application claims the benefit of U.S. Provisional Application Serial No. 60/058,945, THE EFFECT OF MULTIPHASE FLOW ON GAS SCRUBBING AT +2° UPWARD INCLINATIONS, filed Aug. 26, 1997.

BACKGROUND OF THE INVENTION

The present invention relates to a system and method for removing a contaminant from a carrier gas and, more particularly, to a contaminant removal system utilizing a multiphase flow including a series of translating slugs.

Conventional gas scrubbing systems remove gaseous or liquid impurities from a gas by the action of a liquid. Specifically, the contaminated gas is contacted with the liquid and the impurities are dissolved in the liquid, or react chemically with the liquid, to remove the impurities from the gas. The purified gas is then returned to the atmosphere. These conventional systems have found utility in a number of contaminant removal environments. However, there is a continuing pursuit in the field of gas scrubbing to improve the contaminant removal efficiency of the conventional systems, to improve their operational capacity, and to reduce the associated manufacturing and operating costs. Accordingly, there is a need in the art for a high efficiency, high throughput, contaminant removal system that embodies a design that is inexpensive to manufacture and operate.

BRIEF SUMMARY OF THE INVENTION

This need is met by the present invention wherein a contaminant is removed from a carrier gas by entraining the contaminated carrier gas in a multiphase flow including a series of translating slugs.

In accordance with one embodiment of the present invention, a method of removing a contaminant from a carrier gas is provided comprising the steps of: introducing a first fluid into a fluid conduit, wherein the first fluid is characterized by a first fluid flow rate; introducing a second fluid into the fluid conduit, wherein the second fluid is characterized by a second fluid flow rate, and wherein the second fluid comprises a contaminant and a carrier gas; arranging the fluid conduit and establishing the first fluid flow rate and the second fluid flow rate such that a succession of moving slugs are created in the fluid conduit; and providing an outlet flow of a third fluid downstream of the succession of moving slugs, wherein the third fluid comprises the carrier gas and a lower concentration of contaminant than the second fluid.

The fluid conduit may be arranged to define an inclined conduit section and the moving slugs may be created in the inclined conduit section. The inclined conduit section may be inclined at an angle less than approximately 15° or at an angle of approximately 2°. Further, the fluid conduit may be arranged to define a downstream declined conduit section. The first fluid flow rate, the second fluid flow rate, and the arrangement of the fluid conduit may be established such that the slug flow is created in the inclined conduit section and either slug flow or stratified flow is created in the declined conduit section. The declined conduit section may be declined at an angle less than approximately 15° or, more specifically, at an angle of approximately 2° relative to the horizontal reference.

The second fluid may be introduced such that it is characterized by a superficial gas velocity of between about 6 m/s and about 30 m/s or such that it is characterized by a flow rate approximately 15 to 75 times greater than the flow rate of the first fluid, or both. Specifically, depending upon the diameter of the specific fluid conduit in use, the second fluid may be introduced such that it is characterized by a flow rate of up to, or exceeding, approximately 75,000 scfm (35 m³/s). The first fluid flow rate, the second fluid flow rate, and the arrangement of the first fluid conduit may be established such that the moving slugs are created in the conduit at a rate of about 5 to about 120 slugs per minute. The conduit is preferably arranged to define a circular cross-section and a conduit periphery that completely encloses fluids within the conduit.

The method of removing a contaminant from a carrier gas may further comprise the steps of: providing an outlet flow of a fourth fluid downstream of the succession of moving slugs, wherein the fourth fluid comprises a combination of the first fluid and at least a portion of the contaminant from the second fluid; regenerating the fourth fluid by removing a least a portion of the contaminant therefrom; and introducing the fourth fluid with the first fluid. The system can be used with any of a variety of contaminants, as long as an appropriate liquid is provided as the first fluid. Preferably, the first fluid will react with or absorb the contaminant of interest. For example, where the absorbing liquid comprises water, or water and lime, the contaminant may comprises sulphur dioxide, nitrogen dioxide, or chlorine.

In accordance with another embodiment of the present invention, a method of removing a contaminant from a carrier gas is provided comprising the steps of: introducing a liquid into a fluid conduit, wherein the liquid is characterized by a first fluid flow rate and wherein the conduit is arranged to define a conduit periphery that completely encloses fluids within the conduit; introducing a carrier gas and a contaminant into the fluid conduit, wherein the carrier gas is characterized by a second fluid flow rate; arranging the fluid conduit to define an inclined conduit section and establishing the first fluid flow rate and the second fluid flow rate such that a succession of moving slugs are created in the inclined conduit section of the fluid conduit; providing an outlet flow of a third fluid downstream of the succession of moving slugs, wherein the third fluid comprises the carrier gas; providing an outlet flow of a fourth fluid downstream of the succession of moving slugs, wherein the fourth fluid comprises a combination of the liquid and at least a portion of the contaminant from the carrier gas; regenerating the fourth fluid by removing a least a portion of the contaminant therefrom; and introducing the fourth fluid with the liquid.

Accordingly, it is an object of the present invention to provide high efficiency, high throughput, contaminant removal system utilizing a multiphase flow including a series of translating slugs. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

FIGS. 1A–1G illustrate the typical flow patterns and flow anomalies observed in multiphase pipe flow including a layer of water 100 and a layer of gas 140. At low liquid and gas flow rates, see FIG. 1A, the multiphase flow is in a smooth stratified pattern. As the gas flow rate is increased, see FIGS. 1B and 1C, the interface between the water 100 and the gas 140 forms waves 160. If the gas flow rate is increased further, moving plugs of liquid 180 are formed in the flow and completely fill a section of the pipe and form intermittent gas pockets 200 there between, see FIG. 1D. If the gas flow rate is increased further, moving slugs 220 are formed in the flow regime, see FIG. 1E. Characteristics of slug flow include gas pockets 200 of increased length and entrainment of gas bubbles 240 in the front of the slug 220. An additional increase in the gas flow rate creates a flow pattern identified as pseudo-slug flow, see FIG. 1F. Pseudo-slugs 260 are similar to slugs 220, but the mixing zone extends through the slug length allowing occasional gas blow-through between adjacent gas pockets 200. For the purposes of describing and defining the present invention it should be understood that any reference herein to slug flow is intended to cover slug flow, see FIG. 1E, and pseudo-slug flow, see FIG. 1F. At even higher gas flow rates, annular flow is reached, see FIG. 1G. Annular flow exists when the less dense fluid, the gas 140, flows in a core along the center of the pipe while the more dense fluid, the water 100, flows as an annular ring around the gas and along the pipe wall. U.S. Pat. No. 5,708,211 issued to Jepson et al. on Jan. 13, 1998, the disclosure of which is incorporated herein by reference, describes a method and apparatus for determining whether slug flow is present within a pipeline.

Figure 1A:
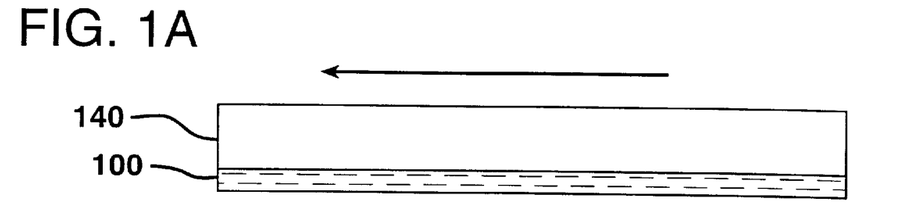
FIGS. 1A–1G illustrate flow patterns within a multiphase fluid within a pipe.
Figure 1B:
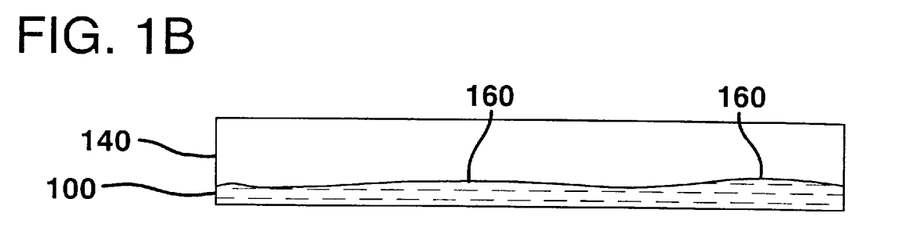
Figure 1C:
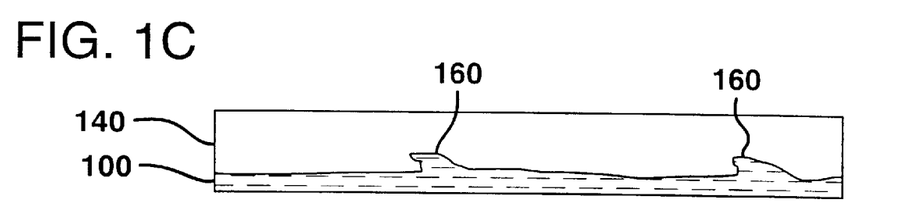
Figure 1D:
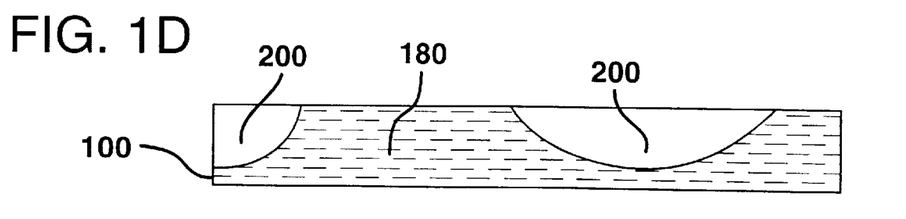
Figure 1E:
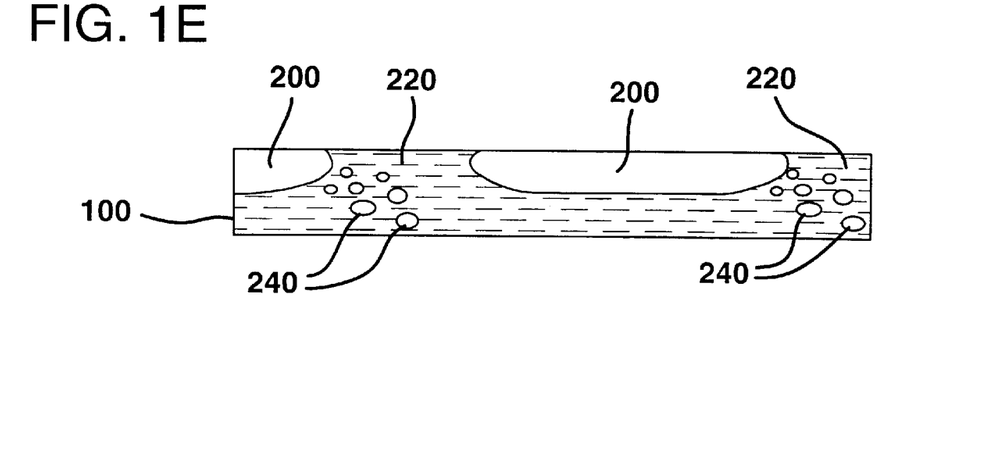
Figure 1F:
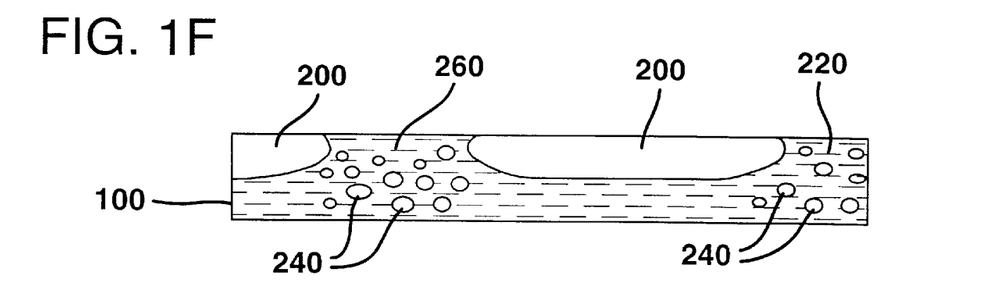
Figure 1G:
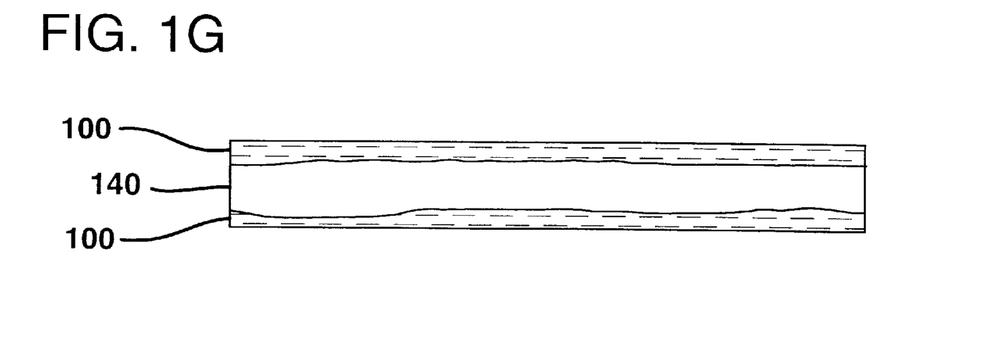

The portion of a slug, i.e., a slug 220 or a pseudo-slug 260, in which gas bubbles 240 are entrained may be referred to as a mixing zone because the gas becomes dispersed within the liquid in this zone. In many cases, this mixing zone is highly turbulent. The turbulence of such a mixing zone may be characterized by a dimensionless Froude number, Fr, and is defined herein by the following equation:

$$Fr = \frac{V_T - V_L}{\sqrt{gh}} \quad \text{equation (1)}$$

where $V_T$ is the translational velocity of the slug in the pipe, $V_L$ is the average velocity of the liquid film ahead of the slug, g is the acceleration due to gravity, and h is the height or thickness of the liquid film ahead of the slug, defined as the cross sectional area of the liquid film divided by its width.

Figure 2:
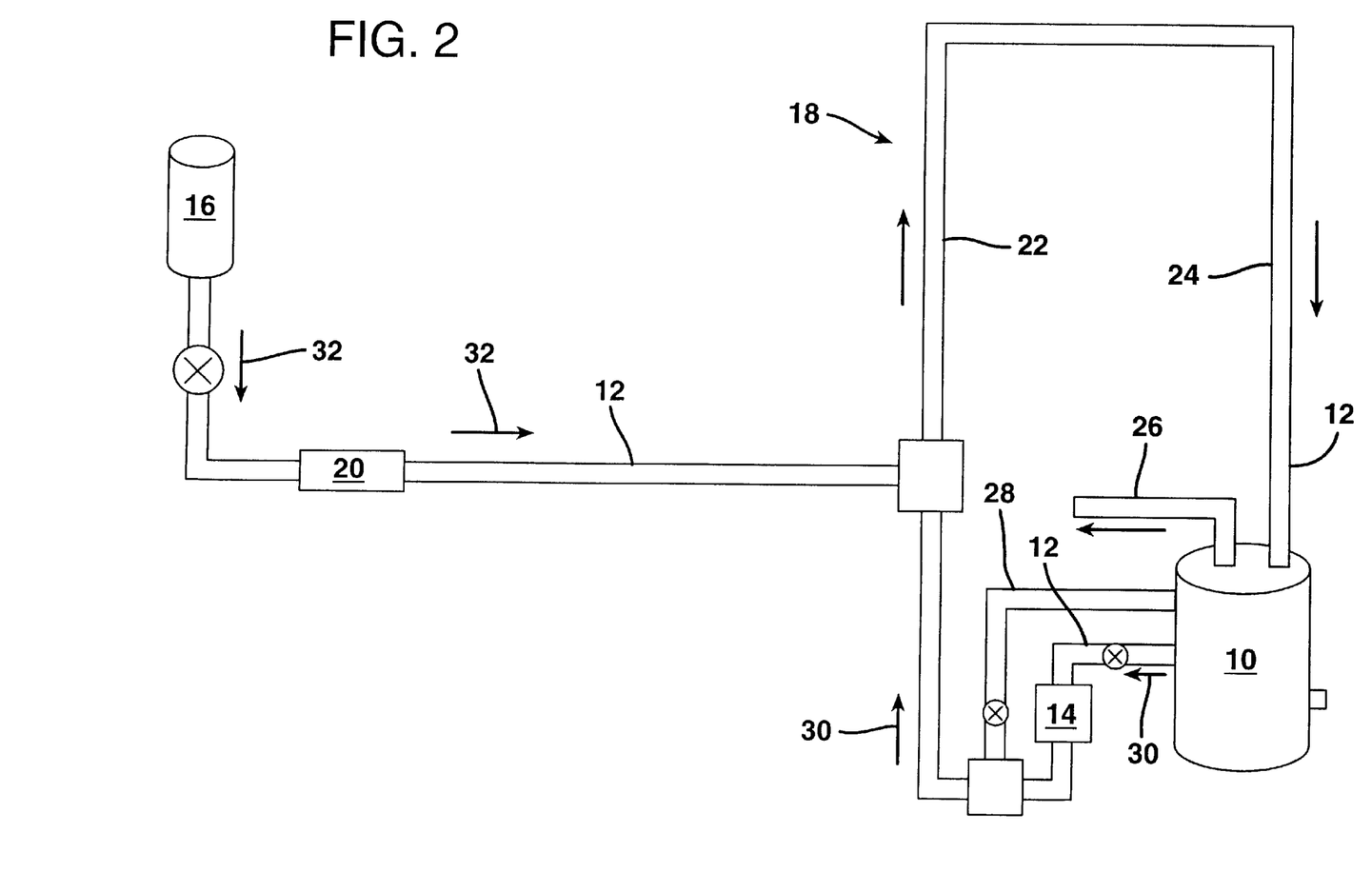
FIG. 2 is a schematic illustration of a method and apparatus for removing a contaminant from a carrier gas according to the present invention.

Referring now to FIG. 2, a method and apparatus for removing a contaminant from a carrier gas are illustrated. In the illustrated embodiment, a first fluid, e.g, 300 gallons (110 m³) of water at ambient temperature and atmospheric pressure, is placed in a 1.2 m³ stainless steel storage tank 10. The storage tank 10 is equipped with heating and cooling coils (not shown) to maintain a constant fluid temperature, typically the ambient temperature. The fluid from the storage tank 10 is pumped into a 10.16 cm ID PVC pipeline 12 by means of a pump 14, e.g. a 76 HP low shear, progressing cavity pump 14 available from MOYNO Industrial Products, Springfield, Ohio. The liquid flow rate is controlled using the speed of the pump 14. A bypass line 28 provides an alternate fluid passage around the pump 14.

A carrier gas 16, e.g., carbon-dioxide, is injected into a decontamination section 18 of the pipeline 12 after measuring the carrier gas flow rate using a gas flow meter 20, e.g., an Omega FL-8910 gas flow meter available from Omega Engineering Inc., Stamford, Conn. In the illustrated embodiment, the flow meter 20 has a range of 2–10 m/s; however, it is contemplated that, where the decontamination section 18 and the pipeline 12 are selected to have greater cross sectional flow areas, the maximum flow rate of the flow meter will necessarily be correspondingly higher. The carrier gas 16 carries a contaminant or pollutant gas and enters the pipeline 12 at atmospheric pressure. To improve the decontamination functions of the present invention, particularly where the contaminant in the carrier gas 16 is sulfur dioxide, lime is introduced into the liquid in the pipeline 12 at a point prior to the decontamination section 18.

According to the method of the present invention, the first fluid, i.e., the liquid, is introduced into the fluid conduit or pipeline 12 at a first fluid flow rate established by the pump 14, as is indicated by directional arrows 30. The second fluid, i.e., the contaminated carrier gas, is introduced into the fluid conduit at a second fluid flow rate established by the flow meter 20, as is indicated by directional arrows 32. The fluid conduit 12 is arranged, and the first and second fluid flow rates are established, such that a succession of moving slugs are created in the decontamination section 18 of the fluid conduit 12. The mixing zones within the moving slugs cause the contaminant within the carrier gas to transfer from the gas to the liquid. Accordingly, a decontaminated gas outlet or vent line 26, may be provided downstream of the succession of moving slugs to vent a third fluid comprising the carrier gas and a significantly lower concentration of contaminant than the contaminated carrier gas provided via the flow meter 20. The pipeline 12 directs the fluid flow from the decontamination section 18 back into the storage tank 10 where the water is recycled.

According to one aspect of the present invention, the decontamination section 18 of the fluid conduit 12 is arranged to define an inclined conduit section 22 and the moving slugs are created in the inclined conduit section 22. In many cases, it is possible to form more turbulent and more frequent slugs in the decontamination section 18 by providing the inclined conduit section 22. In addition, the fluid conduit 12 can be arranged to define a declined conduit section 24 downstream from the inclined conduit section 22. The first and second flow rates may be established such that moving slugs are created in the inclined conduit section 22 and in the declined conduit section 24, or merely in the inclined conduit section 22 with stratified flow in the declined conduit section 24. Typically, the inclined conduit section 22 and the declined conduit section are inclined at an angle less than approximately 15° or, more specifically, at an angle of approximately 2°. In general, an increasing angle of inclination increases the number of slugs that may be formed in the inclined conduit section. Accordingly, if the length of the conduit is limited, it may be preferable to increase the angle of inclination to improve the efficiency of the device. It is contemplated by the present invention, however, that the respective conduit sections may be inclined or declined at any one of a variety of angles to enable creation of the moving slug flow of the present invention.

As will be appreciated by those practicing the present invention, effective moving slug flow in the decontamination section 18 may be created with a variety of fluid conduit arrangements and a variety of specific fluid flow rates. A number of specific operative examples are illustrated herein with reference to specific values for fluid conduit diameter, liquid velocity, gas velocity, slug frequency, gas/liquid ratio, gas quantity, liquid quantity, etc. These specific examples are presented for the purpose of illustrating the present invention and are not intended to limit the scope of the invention, as defined in the appended claims.

According to a number of operative examples of the present invention, a series of decontamination runs were conducted in a 4 inch diameter, 60 ft (18 m) Plexiglas test facility inclined at +2° using water/gas mixtures at liquid and gas superficial velocities of 0.4, 1.0, and 2.0 m/s and 2, 6, and 10 m/s respectively. The gas consisted of primarily carbon-dioxide (main carrier gas) at 1 atm pressure, with sulfur dioxide being the contaminant. As the results described herein illustrate, the system and method for decontamination proved to be very effective in scrubbing sulfur dioxide from the carrier gas. At low input concentrations of 50 and 100 ppm of sulfur dioxide, the scrubbing efficiency was 100% at all the conditions studied. For 500 ppm, and high values of 4500 and 8500 ppm, traces ranging from 2 to 7 ppm of sulfur dioxide were noted at the end of the upward inclined pipeline. These values decreased to 2 to 3 ppm when the combined upward and downward sections were utilized. In general, increasing either the Froude number or the frequency of the slugs, or both, was found to yield improved decontamination. For all the cases studied, adding small amounts of lime (0.3 g/l) to the first fluid, i.e., the water, resulted in the removal of all traces of the sulfur dioxide from the carrier gas. Larger volumes of gas can be handled by increasing the pipe diameter and, if necessary, the inclination of the fluid conduit 12 in the decontamination section 18. It is predicted that about 75,000 scfm (35 m³/s) of gas can be effectively scrubbed by increasing the pipe diameter to 48 inches. Operating at higher pressures also greatly increases the volume of gas that can be processed.

Referring now to tables 1 and 2, the scrubbing performance of a decontamination system is illustrated. The decontamination section comprises two 4 inch (10 cm) diameter 20 m long fluid conduits. One of the 20 m fluid conduits in the decontamination section is inclined 2 degrees and the second declined 2 degrees. For this system, the maximum attainable gas velocity to maintain slug flow is approximately 10 m/s. At atmospheric pressure, there is a change of flow regime from slug to annular flow above a gas velocity of 10 m/s. The results for the upward inclined section using water and water with lime are given in Tables 1 and 2.

TABLE 1

RESULTS OF SULPHUR DIOXIDE SCRUBBING IN +2° INCLINE

| | | | | | | | | WITH LIME | | |
|---|---|---|---|---|---|---|---|---|---|---|
| Liquid Velocity (m/s) | Gas Velocity (m/s) | ppm in → Slug Freq. | 50 | 100 | 500 ppm out (±1) | 4500 | 8500 | 500 ppm out (±1) | 4500 | 8500 |
| 0.4 | 2 | 17 | 0 | 0 | 2 | 4 | 4 | 0 | 0 | 0 |
| | 6 | 7 | 0 | 0 | 4 | 5 | 6 | 0 | 0 | 0 |
| | 10 | 5 | 0 | 0 | 4 | 7 | 7 | 0 | 0 | 0 |
| 1 | 2 | 32 | 0 | 0 | 2 | 3 | 3 | 0 | 0 | 0 |
| | 6 | 30 | 0 | 0 | 0 | 2 | 2 | 0 | 0 | 0 |
| | 10 | 51 | 0 | 0 | 0 | 2 | 3 | 0 | 0 | 0 |
| 2 | 2 | 75 | 0 | 0 | 0 | | | 0 | | |
| | 6 | 49 | 0 | 0 | 0 | | | 0 | | |
| | 10 | 120 | 0 | 0 | 0 | | | 0 | | |

TABLE 2

SCRUBBING EFFICIENCY

| | | ppm in | | | WITH LIME ppm in | | |
|---|---|---|---|---|---|---|---|
| G/L RATIO (scfm/GPM) | Slugs (/min) | 50 | 100 | 500 | 500 | 4500 | 8500 |
| | | % EFFICIENCY | | | % EFFICIENCY | | |
| 0.67 (5 scfm/scfm) | 17 | 100 | 100 | | 100 | 100 | 100 |
| 2 (15) | 7 | 100 | 100 | 96 | 100 | 100 | 100 |
| 3.4 (25) | 5 | 100 | 100 | 96 | 100 | 100 | 100 |
| 0.27 (2) | 32 | 100 | 100 | 100 | 100 | 100 | 100 |
| 0.8 (6) | 30 | 100 | 100 | 98 | 100 | 100 | 100 |
| 1.34 (10) | 31 | 100 | 100 | 100 | 100 | 100 | 100 |
| 0.14 (1) | 75 | 100 | 100 | 100 | | | |
| 0.4 (3) | 49 | 100 | 100 | 100 | | | |
| 0.69 (5.2) | 120 | 100 | 100 | 100 | | | |

At the low liquid velocity of 4.0 m/s, the slug frequency decreases from a value of 17 slugs/min at a gas velocity of 2 m/s to 5 slugs/min at the higher gas velocity of 10 m/s. The slug frequency decreases because there is insufficient liquid in the decontamination section to maintain the slug frequency as the gas velocity is increased. The Froude number of these slugs is relatively high, indicating that all of the slugs are very turbulent in nature and entrain relatively large amounts of gas.

Referring further to Tables 1 and 2, where 50 and 100 ppm of sulfur dioxide is present in the carrier gas, all of the contaminant is absorbed in the liquid. At 500 ppm sulfur dioxide contamination levels, only 2 to 4 ppm remain in the carrier gas at the end of the inclined section. For very high concentrations of sulfur dioxide, e.g., 4500 and 8500, the system is still very effective with output values of 4 to 7 ppm being noted.

Figure 6:
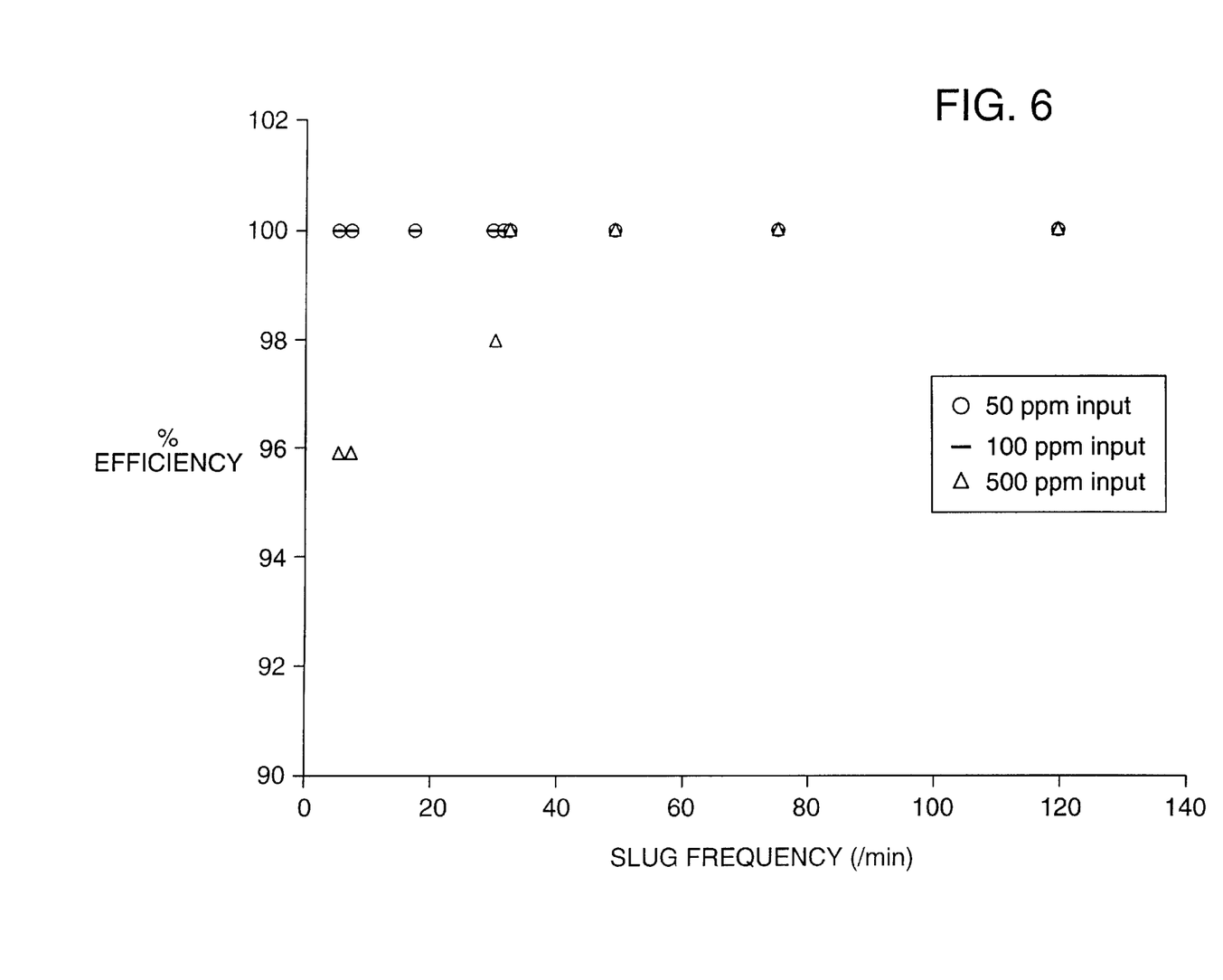
FIG. 6 is a plot illustrating the effect of slug frequency on system efficiency.

The effect of slug frequency on performance is given in FIG. 6. At the higher input levels of sulfur dioxide, increasing slug frequency from 5 to 50 increases the efficiency from 96% to 100%. In the decontamination runs illustrated in Tables 1 and 2, the lowest output contamination levels tended to occur at the highest slug frequencies. However, as the liquid superficial velocity is increased from 0.4 m/s to 1 m/s, the slug frequency increases with no significant corresponding decrease in output contamination at the 2 m/s gas velocity. This unusual result occurs because the Froude number and characteristic turbulence of the moving slugs is lower. Consequently, even though there are more slugs present, there is no significant improvement in system performance. In contrast, when the gas superficial velocity is increased to 6 m/s and 10 m/s, the Froude number increases and the scrubbing is improved with 100% efficiency for an input of 500 ppm. Similar results are seen for the higher liquid superficial velocity of 2 m/s.

Figure 3:
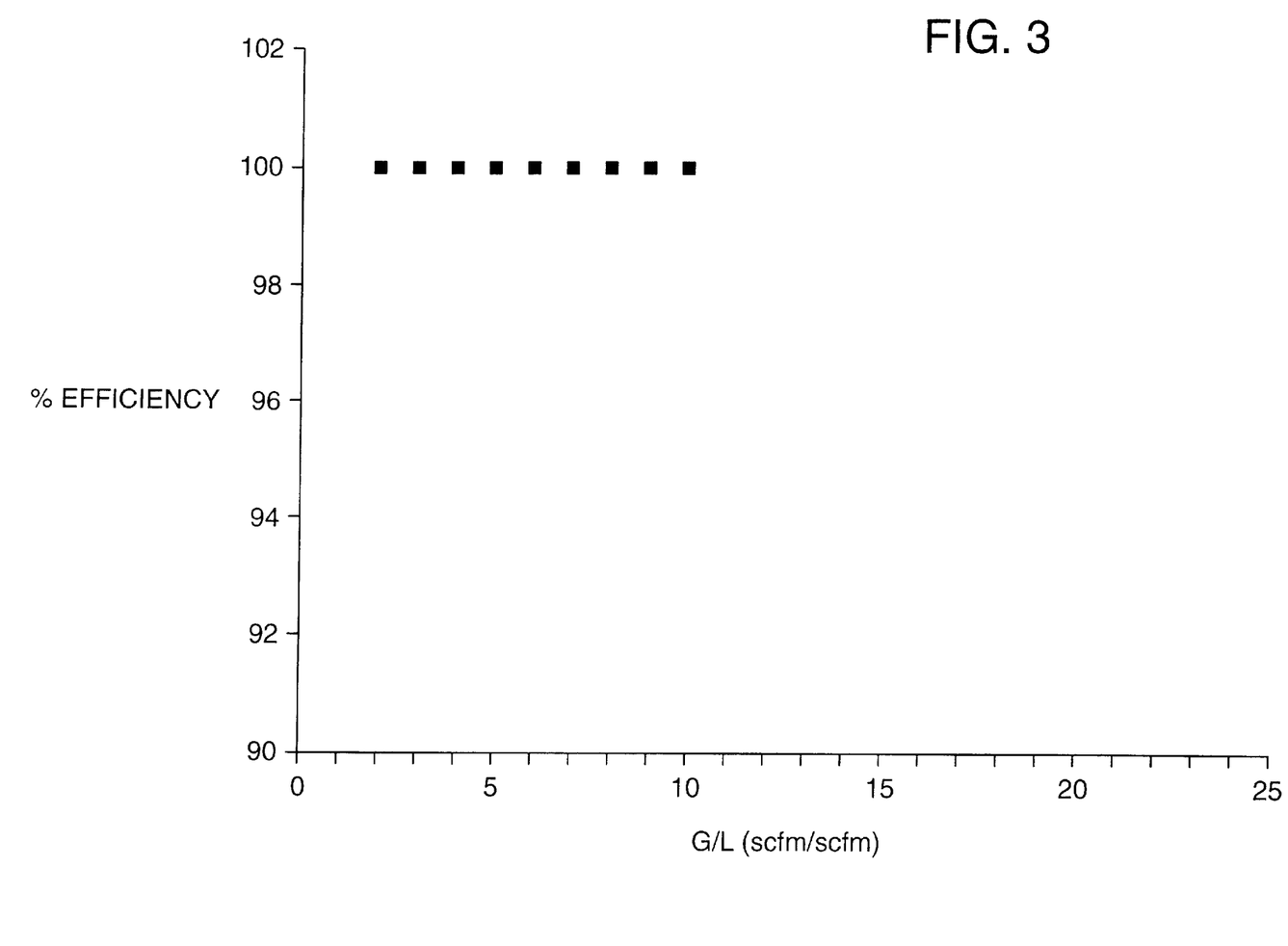
FIG. 3 is a plot of scrubbing efficiency vs. Gas/Liquid ratio for 50 ppm $SO_2$ contaminant input.
Figure 4:
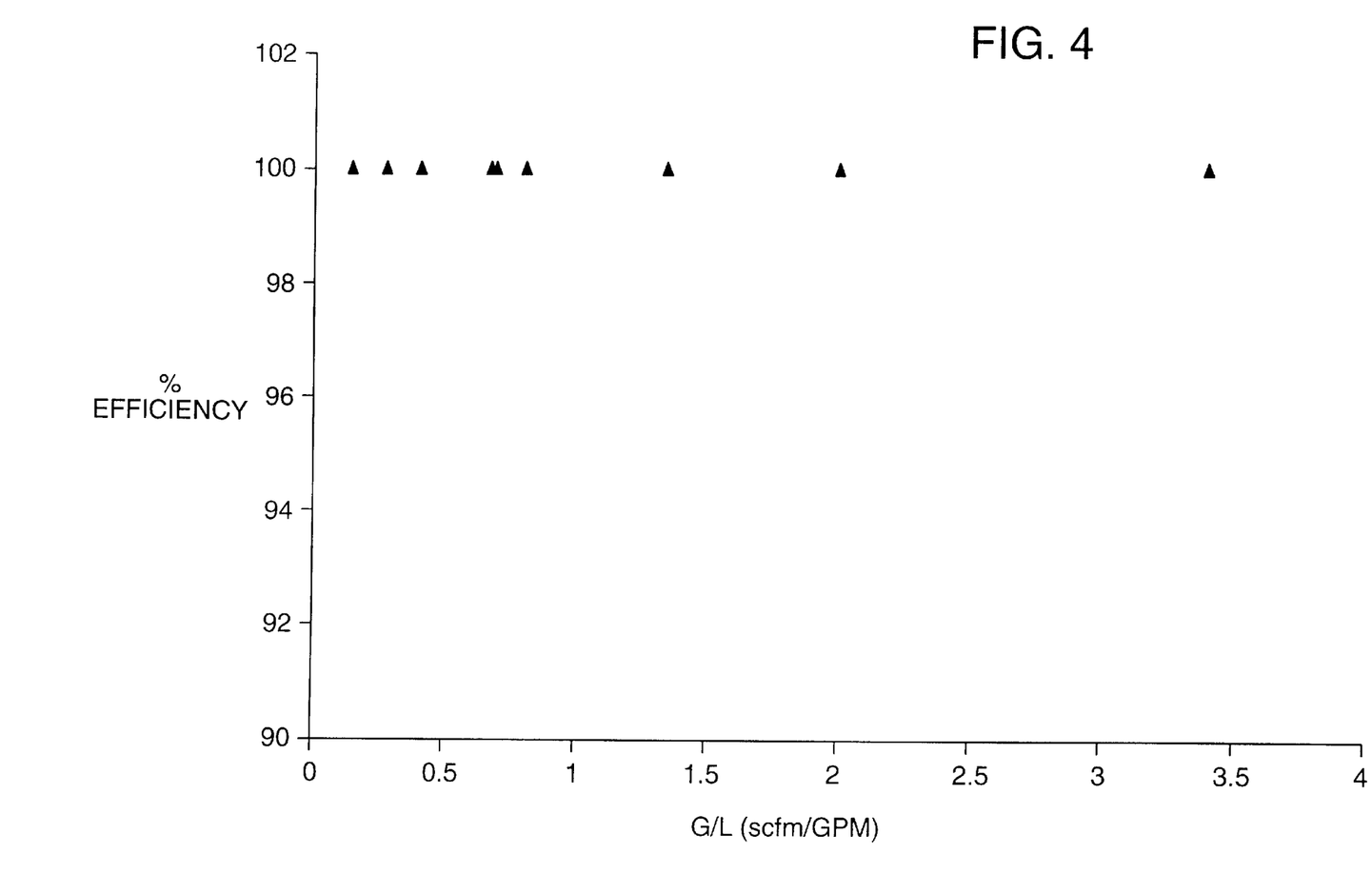
FIG. 4 is a plot of scrubbing efficiency vs. Gas/Liquid ratio for 100 ppm $SO_2$ contaminant input.
Figure 5:
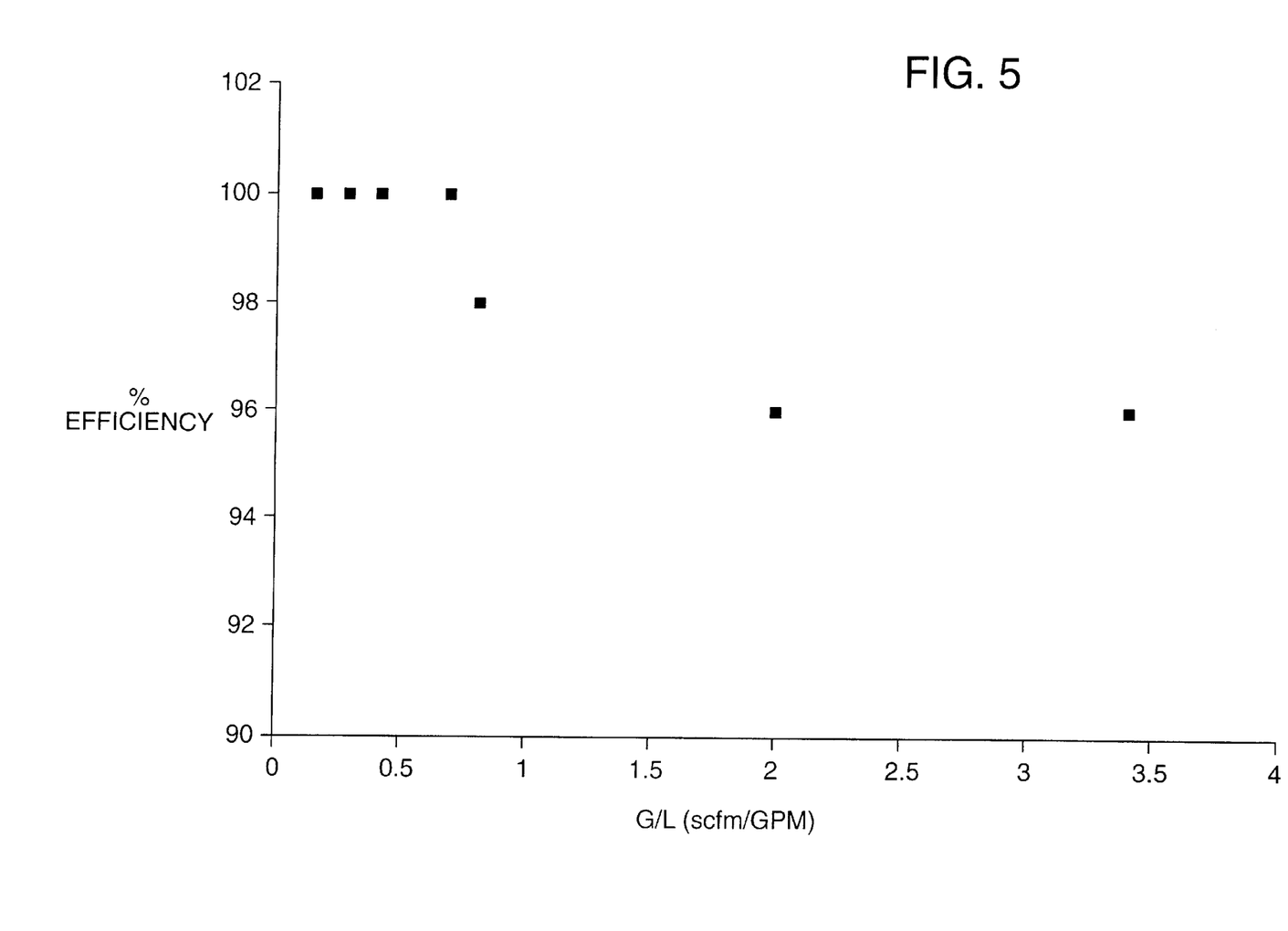
FIG. 5 is a plot of scrubbing efficiency vs. Gas/Liquid ratio for 500 ppm $SO_2$ contaminant input.

Plots of the scrubbing efficiency with ratios of the gas and liquid flow rates are shown in FIGS. 3, 4, and 5. FIG. 3 shows that, for 50 ppm sulfur dioxide input, the efficiency is 100% for gas/liquid ratio values up to 25 scfm/scfm. FIG. 4 shows identical results for the 100 ppm sulfur dioxide input. At 500 ppm input, FIG. 5 indicates that the efficiency is 100% at the lower gas/liquid ratios but above a ratio of about 0.8, the efficiency decreases to 98% and then to 96% at a ratio of 25 scfm/scfm.

Figure 7:
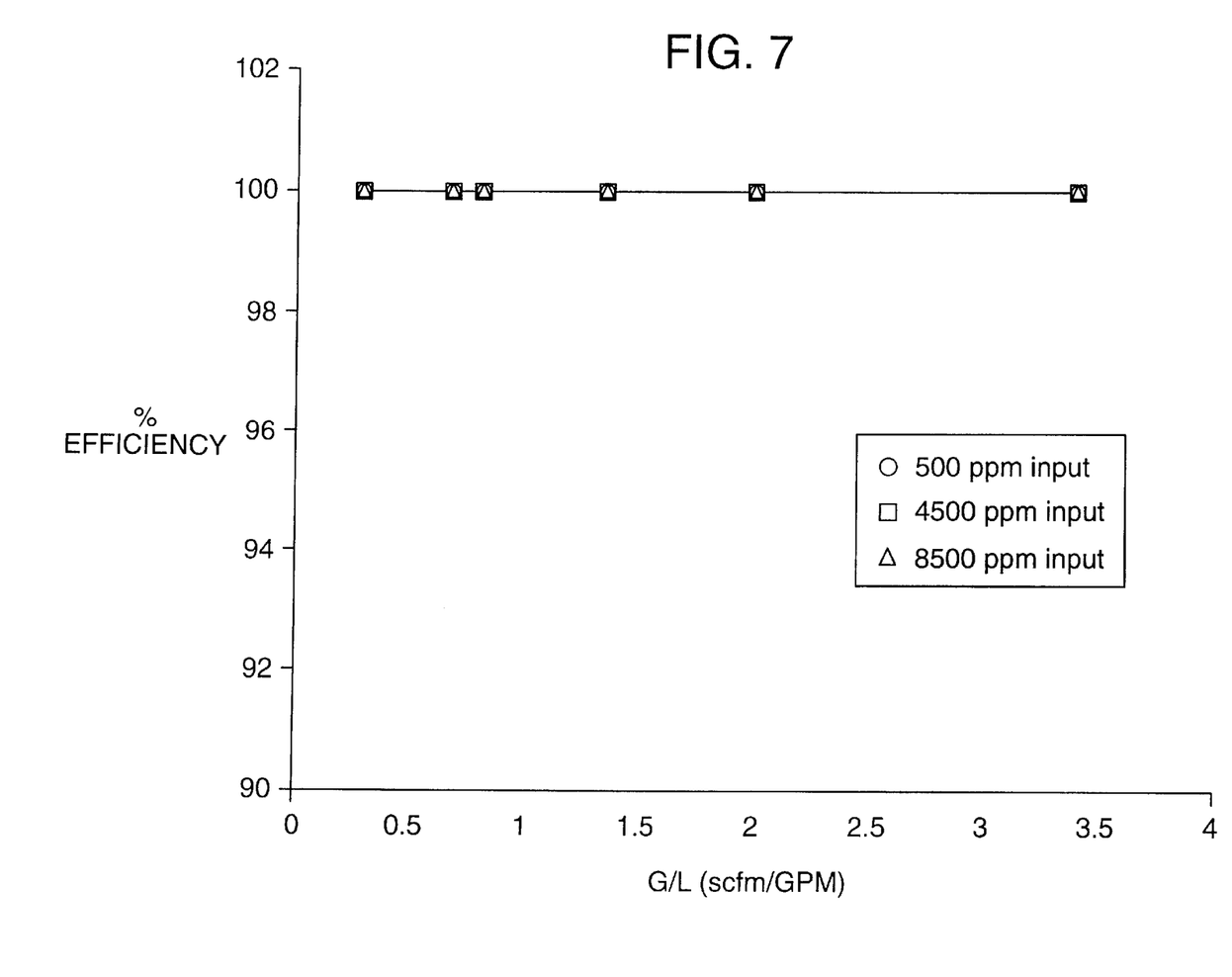
FIG. 7 is a plot illustrating scrubbing efficiency vs. Gas/Liquid ratios for 500, 4500, and 8500 ppm $SO_2$ contaminant input with lime.

Referring now to Table 3, contamination measurements were taken at the end of combined inclined and declined portions of the decontamination section of the fluid conduit. At the 500 ppm input, the efficiency is 100%. Further, at the very high input amounts of 4500 and 8500 ppm, only small traces, 1 to 2 ppm, of sulfur dioxide are found. These results are illustrated in FIG. 7. Preferably, more slugs are generated in the declined section, increasing the total number of slugs in the system.

TABLE 3

SCRUBBING EFFICIENCY IN COMBINED +2°/−2° INCLINE

| Liquid Velocity (m/s) | ppm in → Gas Velocity (m/s) | 50 | 100 | 500 ppm out (±1) | 4500 | 8500 |
|---|---|---|---|---|---|---|
| 0.4 | 6 | 0 | 0 | 0 | 1 | 2 |
|  | 10 | 0 | 0 | 0 | 1 | 2 |
| 1 | 2 | 0 | 0 | 0 | 0 | 2 |
|  | 6 | 0 | 0 | 0 | 0 | 1 |
|  | 10 | 0 | 0 | 0 | 1 | 1 |
| 2 | 2 | 0 | 0 | 0 |  |  |
|  | 6 | 0 | 0 | 0 |  |  |
|  | 10 | 0 | 0 | 0 |  |  |

When running the system for an extended period of time, e.g., about 30 to 40 minutes, the water does become saturated with the sulfur dioxide. Accordingly, it would be preferable to route the water to a regenerator and then recycle it back to the scrubber tank. Lime can be added to the water to neutralize the dissolved sulfur dioxide. A limited number of experiments were conducted with small amounts of lime added to the water. The results given in Tables 1 and 2 show that the lime addition removes the final traces of the sulfur dioxide at all the conditions studied.

For the 4 inch (10 cm.) diameter system, the gas flow rate corresponding to 10 m/s was 172 scfm (0.08 m³/sec) with the water having a minimum of about 7 scfm or 50 gpm (0.003 m³/sec). Many cement kilns require gas handling in excess of 100,000 m³/sec). It is contemplated that an increase in the pipe diameter, an increase contamination section inclination, an increase in the operating pressure, and ions thereof, will result in an increase in gas throughput. Table 4 represents calculations of gas processing capacity based on increased pipe diameter.

TABLE 4

GAS PROCESSING CAPACITY

| D (inch) | Vsg (m/s) | Qg (scfm) | Qg/Q1 (scfm/GPM) | Qg/Q1 (scfm/scfm) | Q1 (GPM) |
|---|---|---|---|---|---|
| 4 | 6 | 103 | 2 | 15 | 60 |
| 4 | 10 | 172 | 3.44 | 25 | 50 |
| 12 | 6 | 925 | 2 | 15 | 460 |
| 12 | 10 | 1550 | 3.4 | 25 | 460 |
| 12 | 20 | 3100 | 6.7 | 50 | 460 |
| 24 | 6 | 3700 | 2 | 15 | 1850 |
| 24 | 10 | 6200 | 3.4 | 25 | 1850 |
| 24 | 20 | 12500 | 6.8 | 50 | 1850 |
| 24 | 26 | 15500 | 8.4 | 62.5 | 1850 |
| 48 | 6 | 15000 | 2 | 15 | 7400 |
| 48 | 10 | 25000 | 3.4 | 25 | 7400 |
| 48 | 20 | 50000 | 6.8 | 50 | 7400 |
| 48 | 25 | 62000 | 8.4 | 62.5 | 7400 |
| 48 | 30 | 75000 | 10.1 | 75 | 7400 |

Increasing the pipe diameter has several benefits. As the pipe diameter is increased to 12, 24 or 48 inches (30, 60, or 120 cm), the amount of gas handled increases by a factors of 9, 36, and 144, respectively, at gas velocities of 6 and 10 m/s. An added benefit of a larger diameters is that the transition from slug to annular flow occurs at higher gas velocities. Consequently, gas velocities of 20, 25, and 30 m/s can be attained in the 12, 24, and 48 inch (30, 60, or 120 cm) diameter pipes respectively. The slug frequencies may be lower at these velocities but this can be overcome by increasing the angle of inclination of the system from 2 to 15 degrees, or higher.

The amount of gas handled per volume of liquid also increases with increase in pipe diameter. The approximate maximum amounts for the 12, 24, and 48 inch (30, 60, or 120 cm) systems are 3,100, 15,500, and 75,000 scfm (1.5, 7.25, and 35 m³/s) respectively. The corresponding liquid flow rates are 460, 1,850, and 7,400 gpm (2.8, 11, and 45 m³/s). This gives the equivalent gas to liquid ratios of 6.7, 8.4, and 10.

Having described the invention in detail and by reference to preferred embodiments thereof, it will be apparent that modifications and variations are possible without departing from the scope of the invention defined in the appended claims.

What is claimed is:

1. A method of removing a contaminant from a carrier gas comprising the steps of:
   introducing a first fluid into a fluid conduit, wherein said first fluid is characterized by a first fluid flow rate;
   introducing a second fluid into said fluid conduit, wherein said second fluid is characterized by a second fluid flow rate, and wherein said second fluid comprises a contaminant and a carrier gas;
   arranging said fluid conduit and establishing said first fluid flow rate and said second fluid flow rate such that a succession of moving slugs are created in said fluid conduit; and providing an outlet flow of a third fluid downstream of said succession of moving slugs, wherein said third fluid comprises said carrier gas and a lower concentration of contaminant than said second fluid.

2. A method of removing a contaminant from a carrier gas as claimed in claim 1 wherein said fluid conduit is arranged to define an inclined conduit section and wherein said moving slugs are created in said inclined conduit section.

3. A method of removing a contaminant from a carrier gas as claimed in claim 2 wherein said inclined conduit section is inclined at an angle less than approximately 15° relative to a horizontal reference.

4. A method of removing a contaminant from a carrier gas as claimed in claim 2 wherein said inclined conduit section is inclined at an angle of approximately 2° relative to a horizontal reference.

5. A method of removing a contaminant from a carrier gas as claimed in claim 1 wherein said fluid conduit is arranged to define an upstream inclined conduit section and a downstream declined conduit section.

6. A method of removing a contaminant from a carrier gas as claimed in claim 5 wherein said first fluid flow rate, said second fluid flow rate, and the arrangement of said fluid conduit are established such that said moving slugs are created in said inclined conduit section and said declined conduit section.

7. A method of removing a contaminant from a carrier gas as claimed in claim 5 wherein said first fluid flow rate, said second fluid flow rate, and the arrangement of said fluid conduit are established such that said moving slugs are created in said inclined conduit section and such that stratified flow is created in said declined conduit section.

8. A method of removing a contaminant from a carrier gas as claimed in claim 5 wherein said fluid conduit is arranged such that said inclined conduit section is inclined at an angle less than approximately 15° relative to a horizontal reference and such that said declined conduit section is declined at an angle less than approximately 15° relative to said horizontal reference.

9. A method of removing a contaminant from a carrier gas as claimed in claim 5 wherein said fluid conduit is arranged such that said inclined conduit section is inclined at an angle of approximately 2° relative to a horizontal reference and such that said declined conduit section is declined at an angle of approximately 2° relative to said horizontal reference.

10. A method of removing a contaminant from a carrier gas as claimed in claim 1 wherein said second fluid is introduced such that it is characterized by a superficial gas velocity of between about 6 m/s and about 30 m/s.

11. A method of removing a contaminant from a carrier gas as claimed in claim 1 wherein said second fluid is introduced such that it is characterized by a flow rate approximately 15 to 75 times greater than said flow rate of said first fluid.

12. A method of removing a contaminant from a carrier gas as claimed in claim 1 wherein said second fluid is introduced such that it is characterized by a superficial gas velocity of between about 6 m/s and about 30 m/s and a flow rate approximately 15 to 75 times greater than said flow rate of said first fluid.

13. A method of removing a contaminant from a carrier gas as claimed in claim 1 wherein said fluid conduit is arranged such that it is characterized by a conduit diameter greater than approximately 10 cm and wherein said second fluid is introduced such that it is characterized by a flow rate approximately 1 to 75 times greater than said flow rate of said first fluid.

14. A method of removing a contaminant from a carrier gas as claimed in claim 1 wherein said second fluid is introduced such that it is characterized by a flow rate of approximately 75,000 scfm (35 m$^3$/s).

15. A method of removing a contaminant from a carrier gas as claimed in claim 1 wherein said first fluid flow rate, said second fluid flow rate, and the arrangement of said first fluid conduit are established such that said moving slugs are created in said conduit at a rate of about 5 to about 120 slugs per minute.

16. A method of removing a contaminant from a carrier gas as claimed in claim 1 wherein said conduit is arranged to define a circular cross-section.

17. A method of removing a contaminant from a carrier gas as claimed in claim 1 wherein said conduit is arranged to define a conduit periphery that completely encloses fluids within said conduit.

18. A method of removing a contaminant from a carrier gas as claimed in claim 1 further comprising the step of introducing a reactive component into the first fluid, wherein said reactive component tends to react with the contaminant.

19. A method of removing a contaminant from a carrier gas as claimed in claim 1 wherein said reactive component comprises lime.

20. A method of removing a contaminant from a carrier gas as claimed in claim 1 further comprising the steps of:
providing an outlet flow of a fourth fluid downstream of said succession of moving slugs, wherein said fourth fluid comprises a combination of said first fluid and at least a portion of said contaminant from said second fluid;
regenerating said fourth fluid by removing a least a portion of said contaminant therefrom; and
introducing said fourth fluid with said first fluid.

21. A method of removing a contaminant from a carrier gas as claimed in claim 1 wherein said contaminant is selected from the group consisting of sulphur dioxide, nitrogen dioxide, and chlorine.

22. A method of removing a contaminant from a carrier gas comprising the steps of:
introducing a liquid into a fluid conduit, wherein said liquid is characterized by a first fluid flow rate and wherein said conduit is arranged to define a conduit periphery that completely encloses fluids within said conduit;
introducing a contaminated carrier gas into said fluid conduit, wherein said carrier gas is characterized by a second fluid flow rate;
arranging said fluid conduit to define an inclined conduit section and establishing said first fluid flow rate and said second fluid flow rate such that a succession of moving slugs are created in said inclined conduit section of said fluid conduit;
providing an outlet flow of a third fluid downstream of said succession of moving slugs, wherein said third fluid comprises said carrier gas;
providing an outlet flow of a fourth fluid downstream of said succession of moving slugs, wherein said fourth fluid comprises a combination of said liquid and at least a portion of said contaminant from said carrier gas;
regenerating said fourth fluid by removing a least a portion of said contaminant therefrom; and
introducing said fourth fluid with said liquid.

* * * * *

UNITED STATES PATENT AND TRADEMARK OFFICE
CERTIFICATE OF CORRECTION

PATENT NO. : 6,017,383

DATED : January 25, 2000

INVENTOR(S) : William P. Jepson

It is certified that error appears in the above-identified patent and that said Letters Patent is hereby corrected as shown below:

Cancel Claim 21.

Column 9, line 7, delete "an" and insert --a linear--.

Column 9, line 8, after "said" insert --linear--.

Insert new claim 23.

--23. A method of removing a contaminant from a carrier gas as claimed in claim 22 wherein said fluid conduit is arranged to define a linear inclined conduit section and wherein said moving slugs are created in said linear inclined conduit section.--

Signed and Sealed this

Fourth Day of July, 2000

*Attest:*

Q. TODD DICKINSON

*Attesting Officer*     *Director of Patents and Trademarks*